(12) United States Patent
Wang et al.

(10) Patent No.: US 8,341,268 B2
(45) Date of Patent: Dec. 25, 2012

(54) RESOURCE SHARING IN MULTI-PRINCIPAL BROWSER

(75) Inventors: Helen Jiahe Wang, Redmond, WA (US); Alexander Moshchuk, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 12/550,293

(22) Filed: Aug. 28, 2009

(65) Prior Publication Data
US 2011/0055395 A1 Mar. 3, 2011

(51) Int. Cl.
*G06F 15/173* (2006.01)
(52) U.S. Cl. ......... 709/226; 709/223; 709/224; 709/225
(58) Field of Classification Search ........... 709/223–226
See application file for complete search history.

(56) References Cited

U.S. PATENT DOCUMENTS

| | | | |
|---|---|---|---|
| 7,155,490 B1 | 12/2006 | Malmer et al. | |
| 2003/0028655 A1 | 2/2003 | Owhadi | |
| 2003/0229900 A1 | 12/2003 | Reisman | |
| 2005/0177753 A1 | 8/2005 | Carpenter | |
| 2005/0278793 A1 | 12/2005 | Raley et al. | |
| 2006/0070066 A1 | 3/2006 | Grobman | |
| 2006/0143437 A1 | 6/2006 | Narin | |
| 2006/0259873 A1 | 11/2006 | Mister | |
| 2007/0011179 A1 | 1/2007 | Paval | |
| 2007/0136579 A1 | 6/2007 | Levy et al. | |
| 2007/0136685 A1 | 6/2007 | Bhatla et al. | |
| 2007/0240212 A1 | 10/2007 | Matalytski | |
| 2008/0244168 A1 | 10/2008 | Warrier et al. | |
| 2008/0313648 A1 | 12/2008 | Wang et al. | |
| 2009/0007152 A1 | 1/2009 | Cahill et al. | |
| 2009/0077124 A1 | 3/2009 | Spivack et al. | |
| 2009/0106456 A1 | 4/2009 | Muller et al. | |
| 2009/0187763 A1 | 7/2009 | Freericks et al. | |
| 2012/0060083 A1 * | 3/2012 | Yuan et al. .................... 715/234 |

FOREIGN PATENT DOCUMENTS
WO WO2008111049 A2 9/2008

OTHER PUBLICATIONS

"Adobe Flash Player Multiple Vulnerabilities", retrieved on Jun. 23, 2009 at <<http://secunia.com/advisories/26027/>>, Secunia Advisories, Secunia, pp. 1-2.
Ajwani, et al., "Characterizing the Performance of Flash Memory Storage Devices and its Impact on Algorithm Design", retrieved on Jun. 23, 2009 at <<http://domino.mpi-inf.mpg.de/internet/reports. nsf/c125634c000710cd80255ef200387b6e/ 97ad4f8726d86917c12573db004b6348/$FILE/MPI-I-2008-1-001. pdf>>, Jan. 2008, 3 title pages and pp. 1-33.

(Continued)

*Primary Examiner* — Mohamed Wasel
(74) *Attorney, Agent, or Firm* — Lee & Hayes, PLLC

(57) ABSTRACT

Techniques for providing resource sharing in a multi-principal browser are described. Resource sharing includes managing a resource for web entity by determining how to divide the resource to share among two or more web entities based at least in part on a Document Object Model (DOM)-recursive resource allocation policy or an application-specified resource allocation policy. A web entity includes a principal instance contending for the resource. The process identifies resource allocation mechanisms from each resource type based at least in part on the DOM-recursive sharing policy or the application-specified resource allocation policy along with the resource type.

20 Claims, 9 Drawing Sheets

OTHER PUBLICATIONS

Anderson, "Computer Security Technology Planning Study", retrieved on Jun. 23, 2009 at <<http://csrc.nist.gov/publications/history/ande72.pdf>>, Oct. 1972, 142 pgs.

Banga, et al., "Resource Containers: A New Facility for Resource Management in Server Systems", retrieved on Jun. 23, 2009 at <<http://www.usenix.org/events/osdi99/full_papers/banga/banga.pdf>>, Proceedings of the 3rd Symposium on Operating Systems Design and Implementation, Feb. 1999, 15 pgs.

Barth, et al., "The Security Architecture of the Chromium Browser", retrieved on Jun. 23, 2009 at <<http://crypto.stanford.edu/websec/chromium/chromium-security-architecture.pdf>>, WWW2009, Apr. 2009, pp. 1-10.

"Capability-Based Computer Systems", retrieved on Jun. 23, 2009 at <<http://www.cs.washington.edu/homes/levy/capabook/Chapter1.pdf>>, pp. 1-18.

"CFS Group Scheduling", retrieved on Jun. 22, 2009 at <<http://lwn.net/Articles/240474/>>, 3 pgs.

Chase, et al., "Sharing and Protection in a Single Address Space Operating System", retrieved on Jun. 23, 2009 at <<http://citeseerx.ist.psu.edu/viewdoc/download;jsessionid=42A05FEE8FC92B18023309645C58BF9E?doi=10.1.1.52.4172&rep=rep1&type=pdf>>, Technical Report Apr. 2, 1993, Department of Computer Science and Engineering, University of Washington, Apr. 1993, revised Jan. 1994, 3 title pages and pp. 1-33.

Chopra, "Browser-based Operating Systems", retrieved on Jun. 23, 2009 at <<http://pcquest.ciol.com/content/search/showarticle.asp?artid=94062>>, PCQuest, 2009, pp. 1-2.

Clark, et al., "An Architectural Overview of the Alpha Real-Time Distributed Kernel", retrieved on Jun. 23, 2009 at <<http://citesserx.ist.psu.edu/viewdoc/download?doi=10.1.1.26.4422&rep=rep1&type=pdf>>, 21 pgs.

Czajkowski, et al., "JRes: A Resource Accounting Interface for Java", retrieved on Jun. 23, 2009 at ACM OOPSLA Conference, Oct. 1998, 15 pgs.

"Document Object Model (DOM)", retrieved on Jun. 23, 2009 at <<http://www.w3.org/dom/>>, W3C DOM IG, Jan. 19, 2005, pp. 1-3.

Douceur, et al., "Leveraging Legacy Code to Deploy Desktop Applications on the Web", retrieved on Jun. 23, 2009 at <<http://www.usenix.org/event/osdi08/tech/full_papers/douceur/douceur_html/index.html>>, Microsoft Research, pp. 1-21.

Eriksen, "Trickle: A Userland Bandwidth Shaper for Unix-like Systems", retrieved on Jun. 23, 2009 at <<http://www.monkey.org/~marius/trickle/trickle.pdf>>, 10 pgs.

Ford, et al., "Evolving Mach 3.0 to a Migrating Thread Model", retrieved on Jun. 23, 2009 at <<http://citeseerx.ist.psu.edu/viewdoc/download;jsessionid=51453CF2C070F6AD810C547DB4588DB9?doi=10.1.1.19.7348&rep=rep1&type=pdf>>, University of Utah, pp. 1-18.

"Gears Improving Your Web Browser", retrieved on Jun. 23, 2009 at <<http://gears.google.com/>>, Google, 2008, 1 pg.

"Geolocation API Specification", retrieved on Jun. 23, 2009 at <<http://dev.w3.org/geo/api/spec-source.html>>, W3, Jun. 8, 2009, pp. 1-6.

"Google Projects for Android", retrieved on Jun. 23, 2009 at <<http://code.google.com/android/>>, Google, pp. 1-3.

Goyal, et al., "A Hierarchical CPU Scheduler for Multimedia Operating Systems", retrieved on Jun. 23, 2009 at <<http://www.cs.virginia.edu/~zaher/classes/CS656/osdi96.pdf>>, Distributed Multimedia Computing Laboratory, Department of Computer Sciences, University of Texas, 15 pgs.

Grier, et al., "Secure Web Browsing With the OP Web Browser", retrieved on Jun. 23, 2009 at <<http://www.cs.uiuc.edu/homes/kingst/Research_files/grier08.pdf>>, 15 pgs.

Grimshaw, et al., "Wide-Area Computing: Resource Sharing on a Large Scale", retrieved on Jun. 23, 2009 at <<http://www.cs.virginia.edu/papers/widearea.pdf>>, Computing Practices, IEEE, May 1999, pp. 29-37.

Hamilton, et al., "The Spring Nucleus: A Microkernel for Objects", retrieved on Jun. 23, 2009 at <<http://research.sun.com/techrep/1993/smli_tr-93-14.pdf>>, Sun Microsystems, Apr. 1993, pp. 1-15.

Harty, et al., "Application-Controlled Physical Memory using External Page-Cache Management", retrieved on Jun. 23, 2009 at <<http://www.cs.ucsb.edu/~ravenben/papers/coreos/HC92.pdf>>, Computer Science Department, Stanford University, 11 pgs.

Howell, et al., "MashupOS: Operating System Abstractions for Client Mashups", retrieved on Jun. 23, 2009 at <<http://www.usenix.org/event/hotos07/tech/full_papers/howell/howell_html/>>, pp. 1-11.

"HTML 5", retrieved on Jun. 23, 2009 at <<http://www.w3.org/html/wg/html5/>>, W3C, Jun. 17, 2009, pp. 1-191.

Hunt, et al., "Singularity: Rethinking the Software Stack", retrieved on Jun. 23, 2009 at <<http://research.microsoft.com/apps/pubs/?id=69431>>, Microsoft Research, Apr. 1, 2007, 1 pg.

Jim, et al., "Defeating Script Injection Attacks with Browser-Enforced Embedded Policies", retrieved on Jun. 23, 2009 at <<http://www2007.org/papers/paper595.pdf>>, WWW 2007, Track: Security, Privacy, Reliability, and Ethics, Session: Defending Against Emerging Threats, 2007, pp. 601-610.

Krueger, et al., "Tools for the Development of Application-Specific Virtual Memory Management", retrieved on Jun. 23, 2009 at <<http://citeseerx.ist.psu.edu/viewdoc/summary?doi=10.1.1.52.9000>>, Computer Science Division, University of California, Berkeley, 17 pgs.

McNamee, et al., "Extending the Mach External Pager Interface to Accommodate User-Level Page Replacement Policies", retrieved on Jun. 23, 2009 at <<http://citeseerx.ist.psu.edu/viewdoc/download?doi=10.1.1.54.1025&rep=rep1&type=pdf>>, Department of Computer Science and Engineering, University of Washington, pp. 1-9.

MemberWiki, "Mobile Device APIs Style Guide", retrieved on Jun. 23, 2009 at <<http://www.openajax.org/member/wiki/Mobile_Device_APIs_Style_Guide>>, Oct. 9, 2008, pp. 1-11.

Moshchuk, et al., "Flashproxy: Transparently Enabling Rich Web Content via Remote Execution", retrieved on Jun. 23, 2009 at <<http://www.cs.washington.edu/homes/gribble/papers/sys169-moshchuk.pdf>>, MobiSys 2008, ACM, 13 pgs.

"NetLimiter—Ultimate Bandwidth Shaper", retrieved on Jun. 23, 2009 at <<http://www.netlimiter.com/>>, Locktime Software, 2003-2008, 1 pg.

Petrou, et al., "Implementing Lottery Scheduling: Matching the Specializations in Traditional Schedulers", retrieved on Jun. 23, 2009 at <<http://www.usenix.org/events/usenix99/full_papers/petrou/petrou.pdf>>, Proceedings of the 1999 USENIX Annual Technical Conference, USENIX, 1999, 15 pgs.

Regehr, "Using Hierarchical Scheduling to Support Soft Real-Time Applications in General-Purpose Operating Systems", retrieved on Jun. 23, 2009 at <<http://citeseer.ist.psu.edu/cache/papers/cs/21991/http:zSzzSzwww.cs.utah.eduzSz~regehrzSzpaperszSzdisszSzregehr-diss-single.pdf/regehr01using.pdf>>, May 2001, pp. i-xii and 1-169.

Reis, et al., "Isolating Web Programs in Modern Browser Architectures", retrieved on Jun. 23, 2009 at <<http://www.cs.washington.edu/homes/gribble/papers/eurosys-2009.pdf>>, EuroSys 2009, ACM, 2009, 13 pgs.

Rizzo, "Dummynet: a simple approach to the evaluation of network protocols", retrieved on Jun. 23, 2009 at <<http://citeseerx.ist.psu.edu/viewdoc/download?doi=10.1.1.57.2969&rep=rep1&type=pdf>>, ACM Computer Communicaton Review, vol. 27, No. 1, Jan. 1997, pp. 31-41.

Saltzer, et al., "The Protection of Information in Computer Systems", retrieved on Jun. 23, 2009 at <<http://www.acsac.org/secshelf/papers/protection_information.pdf>>, 30 pgs.

"Same Origin Policy for JavaScript", retrieved on Jun. 23, 2009 at <<http://www.mozilla.org/projects/security/components/same-origin.html>>, Mozilla Developer Center, pp. 1-3.

Sharma, "What is the REAL speed of your 3G connection", retrieved on Jun. 23, 2009 at <<http://www.xtremelabs.com/blog>>, Xtreme Labs, Dec. 4, 2008, pp. 1-5.

Tanenbaum, et al., "Using Sparse Capabilities in a Distributed Operating System", retrieved on Jun. 23, 2009 at <<http://citeseerx.ist.psu.edu/viewdoc/download?doi=10.1.1.49.7998&rep=rep1&type=pdf>>, pp. 64-74.

"The Multi-Principal OS Construction of the Gazelle Web Browser" Wang et al, Microsoft Research, <<http://research.microsoft.com/apps/pubs/default.aspx?id=79655>> available as early as Feb. 19, 2009, 1 pg.

"V8 JavaScript Engine", retrieved on Jun. 23, 2009 at <<http://code.google.com/p/v8/>>, Google Code, Google, 2009, pp. 1-2.

Vandat, et al., "WebOS: Operating System Services for Wide Area Applications", retrieved on Jun. 23, 2009 at <<http://ieeexplore.ieee.org/stamp/stamp.jsp?tp=&arnumber=709956&isnumber=15339>>, 12 pgs.

Waldspurger, et al., "Lottery Scheduling: Flexible Proportional-Share Resource Management", retrieved on Jun. 23, 2009 at <<http://www.usenix.org/publications/library/proceedings/osdi/full_papers/waldspurger.pdf>>, MIT Laboratory for Computer Science, 11 pgs.

Wallach, et al., "Extensible Security Architectures for Java", 16th Symposium on Operating Systems Principles, Oct. 1997, Saint-Malo, France, retrieved on Jun. 23, 2009 at <<http://www.csl.sri.com/users/ddean/papers/sosp97.pdf>>, pp. 1-26.

Wang, et al., "Protection and Communication Abstractions for Web Browsers in MashupOS", SOSP'07, Oct. 14-17, 2007, Stevenson, WA, retrieved on Jun. 23, 2009 at <<http://research.microsoft.com/en-us/um/people/helenw/papers/sosp07mashupos.pdf>>, 15 pgs.

Wang, et al., "The Multi-Principal OS Construction of the Gazelle Web Browser", retrieved on Jun. 23, 2009 at <<http://research.microsoft.com/pubs/79655/gazelle.pdf>>, MSR Technical Report MSR-TR-2009-16, pp. 1-20.

"What's New in Internet Explorer 8", retrieved on Jun. 23, 2009 at <<http://msdn.microsoft.com/en-us/library/cc288472.aspx>>, Microsoft Corporation, 2009, pp. 1-10.

Wilburn, et al., "The Light Field Video Camera", retrieved on Jun. 23, 2009 at <<http://graphics.stanford.edu/papers/lfvc/wilburn-lfcamera-spie02.pdf>>, Computer Systems Lab, Electrical Engineering Department, Stanford University, 8 pgs.

Wobber, et al., "Authorizing Applications in Singularity", ACM, EuroSys'07, Mar. 21-23, 2007, Lisboa, Portugal, retrieved on Jun. 23, 2009 at <<http://research.microsoft.com/pubs/59976/eurosys2007_security.pdf>>, 14 pgs.

Office Action for U.S. Appl. No. 12/433,788, mailed on Nov. 21, 2011, Jiahe Helen Wang, "Secure Multi-Principal Web Browser", 15 pgs.

Office Action for U.S. Appl. No. 12/550,263, mailed on Dec. 21, 2011, Jiahe Helen Wang, "Access Control in a Multi-Principal Browser", 17 pgs.

".NET Framework Developer Center", retrieved on May 24, 2010 at <<http://msdn.microsoft.com/en-us/netframework/default.aspx>>, Microsoft Corporation, 2010, pp. 1.

"Adobe Flash Player 9 Security Whitepaper", retrieved on May 24, 2010 at <<http://www.adobe.com/devnet/flashplayer/articles/flash_player_9_security.pdf>>, Adobe Systems Incorporated, Jul. 2008, pp. 1-50.

Barth, et al., "Protecting Browsers from Frame Hijacking Attacks", retrieved on May 24, 2010 at <<http://crypto.stanford.edu/websec/frames/navigation/>>, Stanford Web Security Research, 2007, pp. 1-5.

Barth, et al., "Securing Frame Communication in Browsers", retrieved May 24, 2010 at <<http://seclab.stanford.edu/websec/frames/post-message.pdf>>, Communications of the ACM, vol. 52, No. 6, Jun. 2009, pp. 83-91.

"Changes in AllowScriptAccess default (Flash Player)", retrieved on May 24, 2010 at <<http://www.adobe.com/go/kb403183>>, Adobe Systems Incorporated, 2010, pp. 1-8.

Chen, et al., "An Analysis of Browser Domain-Isolation Bugs and a Light-Weight Transparent Defense Mechanism", retrieved on May 24, 2010 at <<http://research.microsoft.com/en-us/people/shuochen/papers/scriptaccenting.pdf>>, ACM, Proceedings of Conference on Computer and Communications Security (CCS), Alexandria, VA, 2007, pp. 2-11.

"Components.utils.evalInSandbox", retrieved Jun. 4, 2010, from: https://developer.mozilla.org/En/Components.utils.evalInSandbox, 4 pages.

Crockford, "JSONRequest", retrieved on May 24, 2010 at <<http://www.json.org/jsonrequest.html>>, Apr. 17, 2006, pp. 1-8.

Crockford, "The <module> Tag, A Proposed Solution to the Mashup Security Problem", retrieved on May 24, 2010 at <<http://www.json.org/module.html>>, Oct. 30, 2006, pp. 1-3.

Crockford, "The module Tag, A Proposed Solution to the Mashup Security Problem", retrieved on May 24, 2010 at <<http://www.json.org/module.html>>, Oct. 30, 2006, pp. 1-3.

"Cross-domain Vulnerability in Microsoft Internet Explorer 6", retrieved on May 24, 2010 at <<http://cyberinsecure.com/cross-domain-vulnerability-in-microsoft-internet-explorer-6/>>, CyberInsecure.com, Jun. 27, 2008, pp. 1-9.

D. Kristol and L. Montulli. "HTTP State Management Mechanism". RFC 2965, Oct. 2000, 25 pages.

Dhamija, et al., "The Battle Against Phishing: Dynamic Security Skins", retrieved on May 24, 2010 at <<http://citeseerx.ist.psu.edu/viewdoc/download?doi=10.1.1.60.9398&rep=rep1&type=pdf>>, Symposium On Usable Privacy and Security (SOUPS), Pittsburgh, PA, Jul. 2005, pp. 1-12.

"Document Object Model (DOM) Level 2 Core Specification", retrieved on May 24, 2010 at <<http://www.w3.org/TR/DOM-Level-2-Core/>>, W3C Recommendation, Nov. 13, 2000, pp. 1-3.

Dutta, "Client Side Cross-Domain Security Whitepaper", retrieved on May 24, 2010 at <<http://code.msdn.microsoft.com/xdsecuritywp/Release/ProjectReleases.aspx?ReleaseId=1157>>, Microsoft Corporation, Jun. 2008, pp. 1-24.

"Firefox 3 for developers—MDC", retrieved on May 24, 2010 at <<https://developer.mozilla.org/en/Firefox_3_for_developers>>, mozilla.org, Sep. 1, 2009, pp. 1-9.

Flanagan, "JavaScript: The Definitive Guide". O'Reilly Media Inc., Aug. 2006, 1020 pages.

Goldberg, et al., "A Secure Environment for Untrusted Helper Applications, Confining the Wily Hacker", retrieved on May 24, 2010 at <<http://www.cypherpunks.ca/~iang/pubs/janus-usenix96.pdf>>, USENIX Association, Proceedings of Conference on Security Symposium, Focusing on Applications of Cryptography, vol. 6, 1996, pp. 1-13.

GreenBorder—Wikipedia, retrieved Jun. 4, 2010 from: http://en.wikipedia.org/wiki/GreenBorder, 1 page.

Grier, et al., "building a more secure Web browser", retrieved on May 24, 2010 at <<http://www.usenix.org/publications/login/2008-08/pdfs/grier.pdf>>, Login: The USENIX Magazine, vol. 33, No. 4, Aug. 2008, pp. 14-21.

Grossman, "Advanced Web Attack Techniques using GMail", retrieved on May 24, 2010 at <<http: //jeremiahgrossman.blogspot.com/2006/01/advanced-web-attack-techniques-using.html>>, Jan. 27, 2006, pp. 1-7.

"How Mozilla determines MIME Types", Aug. 2006, retrieved from: http://developer.mozilla.org/en/docs/How_Mozilla_determines_MIME_Types., 4 pages.

"HTML 4.01 Specification", retrieved on May 24, 2010 at <<http://www.w3.org/TR/REC-html40/>>, W3C Recommendation, Dec. 24, 1999, pp. 1-12.

HTML5 (including next generation additions still in development), Draft Standard, Jun. 2, 2010, Retrieved from: http://www.whatwg.org/specs/web-apps/current-work/, 384 pages.

Hunt, et al., "Detours: Binary Interception of Win32 Functions", retrieved on May 24, 2010 at <<http://research.microsoft.com/pubs/68568/huntusenixnt99.pdf>>, USENIX Association, Proceedings of Windows NT Symposium, Seattle, WA, Jul. 1999, pp. 1-9.

"IE content-type logic", retrieved on May 24, 2010 at <<http://blogs.msdn.com/ie/archive/2005/02/01/364581.aspx>>, Microsoft Corporation, IEBlog, 2010, pp. 1-16.

"IEBlog—IE8 Security Part V—Comprehensive Protection", retrieved on May 24, 2010 at <<http://blogs.msdn.com/ie/archive/2008/07/02/ie8-security-part-v-comprehensive-protection.aspx>>, Microsoft Corporation, IEBlog, 2010, pp. 1-41.

"Introducing JSON", retrieved on May 24, 2010 at << http://www.json.org/>>, JSON, 2010, pp. 1-6.

Ioannidis, et al., "Building a Secure Web Browser", retrieved on May 24, 2010 at <<http://citeseerx.ist.psu/edu/viewdoc/download-?doi=10.1.1.120.2439&rep=rep1&type=ps>>, USENIX Association, Proceedings of FREENIX Track: 2001 Technical Conference, 2001, pp. 127-134.

Jackson, et al., "Protecting Browser State from Web Privacy Attacks", retrieved on May 24, 2010 at <<http://citeseerx.ist.psu.edu/viewdoc/download?doi=10.1.1.75.4136&rep=rep1&type=pdf>>, ACM, Proceedings of International Conference on World Wide Web (WWW), Edinburgh, UK, May 2006, pp. 737-744.

Jackson, et al., "Protecting Browsers from DNS Rebinding Attacks", retrieved on May 24, 2010 at <<http://crypto.stanford.edu/dns/dns-rebinding.pdf>>, ACM, Proceedings of Conference on Computer and Communications Security (CCS), Alexandria, VA, 2007, pp. 421-431.

Meketa, "Security changes in Flash Player 7", retrieved on May 24, 2010 at <<http://www.adobe.com/devnet/flash/articles/fplayer_security.html>>, Adobe Systems Incorporated., Flash Player Developer Center, 2010, pp. 1.

"Microsoft Internet Explorer Remote Window Hijacking Vulnerability", retrieved on May 24, 2010 at <<http://www.securityfocus.com/bid/11855>>, SecurityFocus, Dec. 8, 2004, pp. 1-18.

"Microsoft Security Intelligence Report (SIR)", retrieved on May 24, 2010 at <<http://www.microsoft.com/security/portal/sir.aspx>>, Microsoft Corporation, Malware Protection Center, vol. 8, 2009, pp. 1-3.

"Microsoft working on a new secure Web Browser—Gazelle", retrieved on May 24, 2010 at <<http://www.computersafetytip.com/microsoft-working-on-a-new-secure-web-browser-%E2%80%93-gazelle.html>>, Computersafetytip.com, Mar. 10, 2009, pp. 1-3.

"Microsoft's 'Gazelle' Browser more secure than all others", retrieved on May 24, 2010 at <<http://forum.thewindowsclub.com/microsoft-technologies-discussions/27090-microsofts-gazelle-browser-more-secure-than-all-others.html>>, The Windows Club, Feb. 24, 2009, pp. 1-4.

Miller, et al., "Paradigm Regained: Abstraction Mechanisms for Access Control", retrieved on May 24, 2010 at <<http://www.springerlink.com/index/L52PWK0K3G02E37B.pdf>>, Springer-Verlag Berlin, Lecture Notes in Computer Science vol. 2896, Advances in Computer Science—ASIAN 2003, 2003, pp. 224-242.

"MIME Type Detection in Internet Explorer", retrieved on May 24, 2010 at <<http://msdn.microsoft.com/en-us/library/ms775147.aspx>>, Microsoft Corporation, 2010, pp. 1-4.

Morrisett, et al., "From System F to Typed Assembly Language", retrieved on May 24, 2010 at <<http://citeseerx.ist.psu.edu/viewdoc/download?doi=10.1.1.24.6526&rep=rep1&type=pdf>>, ACM Transactions on Programming Languages and Systems (TOPLAS), vol. 21, No. 3, 1999, pp. 527-568.

"Mozilla Browser and Mozilla Firefox Remote Window Hijacking Vulnerability", retrieved on May 24, 2010 at <<http://www.securityfocus.com/bid/11854/>>, SecurityFocus, Dec. 8, 2004, pp. 1-10.

Necula, et al., "Safe Kernel Extensions Without Run-Time Checking", retrieved on May 24, 2010 at <<http://www.cs.arizona.edu/~collberg/Teaching/620/1999/Handouts/imurdock1.pdf>>, ACM SIGOPS Operating Systems Review, vol. 30, No. SI, 1996, pp. 229-243.

Process Models (The Chromium Projects), "The Chromium Projects", 2008, retrieved on Jun. 4, 2010 from http://dev.chromium.org/developers/design-documents/process-modelshttp://dev.chromium.org/developers/design-documents/process-models, 5 pgs.

Reis, et al., "Browser Security: Lessons from Google Chrome", retrieved on May 24, 2010 at <<http://www.adambarth.com/papers/2009/reis-barth-pizano.pdf>>, Communications of the ACM, vol. 52, No. 8, 2009, pp. 45-49.

Reis, et al., "Using Processes to Improve the Reliability of Browser-based Applications", retrieved on May 24, 2010 at <<http://citeseerx.ist.psu.edu/viewdoc/download;jsessionid=EFE2131C07872525A24DD03BDBBAB2F2?doi=10.1.1.136.2646&rep=rep1&type=pdf>>, University of Washingto, Technical Report UW-CSE-2007-12-01, 2007, pp. 1-13.

Ruderman, J. "Same origin policy for JavaScript", retrieved Jun. 4, 2010, from: https://developer.mozilla.org/En/Same_origin_policy_for_JavaScript, 2 pages.

"Security Advisories for Firefox 2.0", retrieved on May 24, 2010 at <<http://www.mozilla.org/security/known-vulnerabilities/firefox20.html>>, Mozilla.org, 2010, pp. 1-6.

"Security Center—Bulletins Advisories Tools Guidance Resources", 2010, retrieved Jun. 4, 2010 from: http://technet.microsoft.com/en-us/security/default(printer).aspx, 2 pages.

Shankar, et al., "Doppelganger: Better Browser Privacy Without the Bother", retrieved on May 24, 2010 at <<http://citeseerx.ist.psu.edu/viewdoc/download?doi=10.1.1.68.4489&rep=rep1&type=pdf>>, ACM, Proceedings of Conference on Computer and Communications Security (CCS), Alexandria, VA, 2006, pp. 154-167.

The Chromium Projects, "Process Models", 5 pages, retrieved on Jul. 16, 2010 at <<http://dev.chromium.org/developers/design-documents/process-models>>.

Turner, D.,Symantec internet security threat report: Trends for Jan.-Jun. 2007, Technical Report Symantec Inc., 2007, vol. XII, 134 pages.

van Kesteren (ed.), "XMLHttpRequest", retrieved on May 24, 2010 at <<http://www.w3.org/TR/XMLHttpRequest/>>, W3C Working Draft, Nov. 29, 2009, pp. 1-17.

van Kesteren (ed.), "XMLHttpRequest Level 2", retrieved on May 24, 2010 at <<http://dev.w3.org/2006/webapi/XMLHttpRequest-2/>>, W3C, 2009, pp. 1-23.

W3C. Authorizing Read Access to XML Content Using the <?accesscontrol?> Processing Instruction 1.0. http://www.w3.org/TR/access-control/, May 2006, 1 page.

Wagner, et al., "A Security Analysis of the Combex DarpaBrowser Architecure", retrieved on May 24, 2010 at <<http://www.combex.com/papers/darpa-review/security-review.html>>, Darpa Review, Mar. 2, 2002, pp. 1-26.

Wang et al., "Protection and Communication Abstractions in MashupOS". In ACM Symposium on Operating System Principles, Oct. 2007, 15 pages.

Yu, et al., "JavaScript Instrumentation for Browser Security", retrieved on May 24, 2010 at <<http://www.docomolabsresearchers-usa.com/~dyu/js-tr.pdf>>, ACM, Proceedings of Symposium on Principles of Programming Languages (POPL), Jan. 2007, Nice, FR, pp. 237-249.

* cited by examiner

RESOURCE SHARING IN MULTI-PRINCIPAL BROWSER

RELATED APPLICATION

This disclosure describes, in part, resource sharing, while a co-pending patent application describes, in part, access control. The co-pending patent application for access control is entitled, "Access Control In A Multi-Principal Browser", application Ser. No. 12/550,263, that is filed concurrently on Aug. 28, 2009, and is incorporated by reference for all that it teaches.

BACKGROUND

A wide range of conventional network services are being offered to users by service providers or through software applications. The conventional network services offered may allow users to access these services via a web browser. These web browsers were originally designed and built as single web site platforms on which a principal, namely a web site, is viewed one at a time and the browser resources are devoted to that web site principal.

Problems occur, however, when the web browsers evolve into principal operating environments, where mutually distrusting web site principals share the underlying system resources. To avoid depriving users access to multiple web sites, some service providers have proposed to architect the web browser as a multiple principal operating system. However, there is no management of resources available in the multiple principal operating system browsers.

The problem with the multiple principal operating systems is that it does not manage resource sharing for today's existing browsers. In particular, the problem is a lack of managing resource sharing for computing processing units (CPUs), memory, or network bandwidth for web applications. This lack of resource management impacts capabilities and quality of the web applications.

In an attempt to manage these resources, one technique maps web site principals onto commodity operating system's user principals (e.g., putting different web site principals into separate processes and labeling each process with a unique identifier). However, this technique has been found to be insufficient for the web applications, particularly because the web applications embed content. This problem occurs when web applications embed different content from several different principals.

Without resource management available, a web site principal is given the ability to obtain arbitrary amounts of resources. There is no fairness of the resources across the contending principal instances. The principal instances are an independent execution instance of the same web site. Thus, there is no resource management across the web site principals in today's operating systems, especially for the web applications' recursive cross-principal service composition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes resource management services that, for example, manage resource sharing among two or more contending web entities (e.g., web sites or web applications) in a multi-principal browser. Managing resources includes determining how to divide the resource to share between the different web entities and dividing the resource for sharing among authorized web entities. The resources may include a central processing unit (CPU), a memory, a network bandwidth, and devices (e.g., a camera, a Global Positioning System navigation device, etc.).

In an implementation, the resource sharing services include sharing the resources that are in contention among the principal instances. This implementation applies a Document Object Model-recursive resource allocation policy. With this policy, the resources may be divided recursively along a principal-embedding hierarchy of a web entity to provide a balanced and a proportional share of the resources among the web entities. The resources may be divided equally among contending principal instances. Furthermore, the resource sharing services may include identifying resource allocation mechanisms based on a resource type.

In another implementation, an application-specified resource allocation policy specifies a resource share for the web entity and embedded content. The resource share is granted based on a priority assigned for the web entity and the embedded content. This process allows web programmers to explicitly influence resource management based on web entity semantics.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
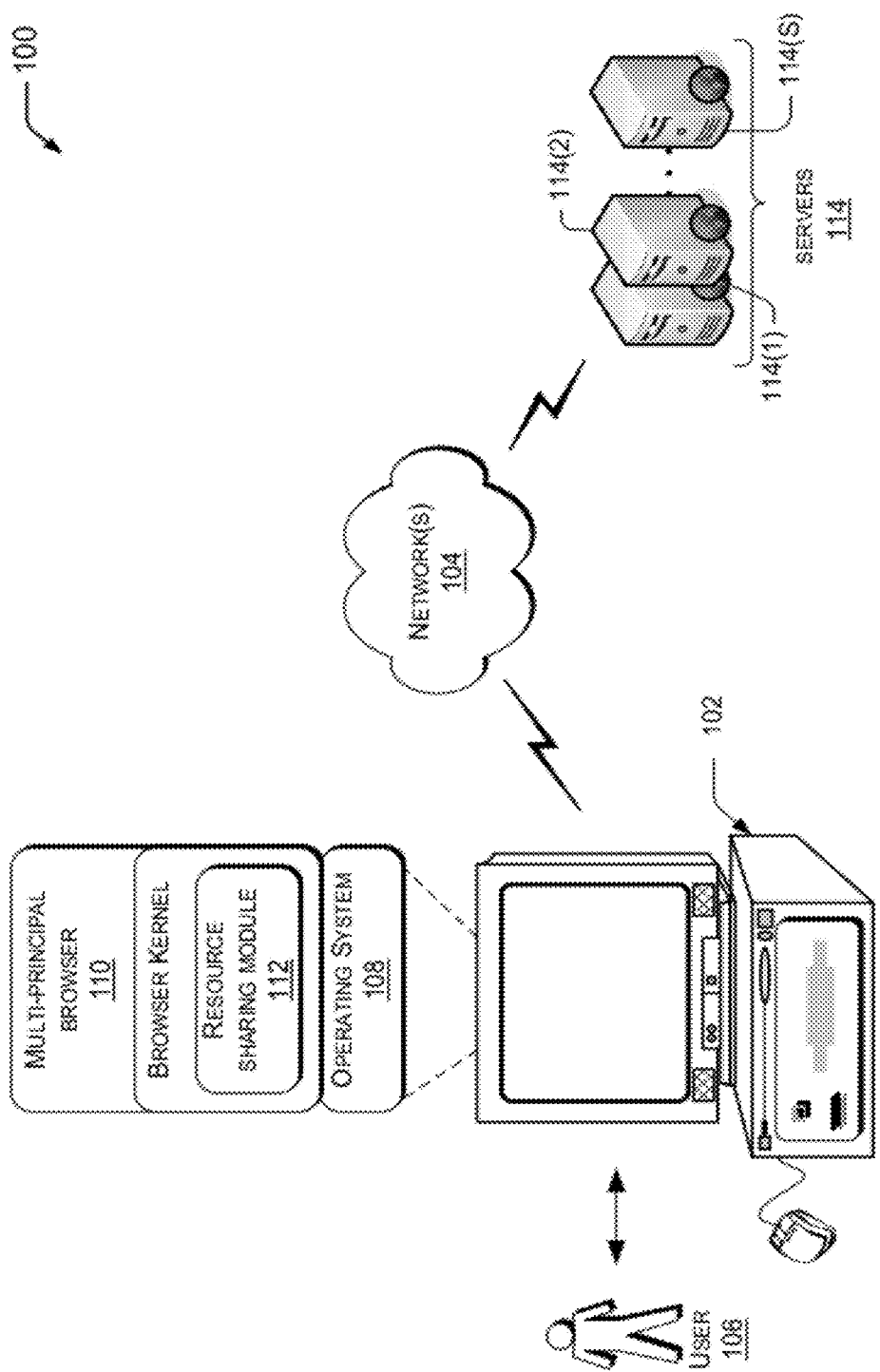
FIG. 1 is a schematic showing an illustrative environment for resource sharing using a multi-principal browser.

As discussed above, conventional operating systems may not always provide an effective way of managing resources in today's existing browsers. For example, in some instances (e.g., in instances where a browser operates multiple web applications from mutually distrusting web sites), it may be difficult to manage which resources to share and to determine how much resource to allocate for a web entity. Moreover, conventional operating systems may not be able to readily distinguish when the web entity obtains arbitrary amounts of resources (i.e., web applications may embed content from several, different principals). This lack of resource management impacts the capabilities and quality of today's web entity, making them less rich and less robust than desktop counterparts. This disclosure describes various illustrative ways of managing resources by, for example, identifying the resources to be shared and determining how to allocate the resources fairly among the web entities. Fairness may be defined as allocating a balanced and a proportional share of the resource or a predetermined allocation of the resource to the contending web entity. Thus, the techniques described in detail below provide the web entity with superior service quality, fairness, and security, and enable the web entity to perform as richly as corresponding desktop applications.

In an implementation, the techniques for resource sharing are to manage resources by determining how to share the resources between contending authorized principals or their principal instances. For example, in a browser, a principal may be a web site. The techniques allow a user with a computing device to access a principal operating systems-based browser with a resource module to determine how to divide the resources fairly to enable the web entities to perform to their capabilities. By way of example and not limitation, the resources may include a computer processing unit (CPU), a memory, a network bandwidth, and devices like a camera, a microphone, or a global positioning system (GPS) navigation unit. Depending on the resources, there are different resource allocation mechanisms applicable for each type.

In an implementation, the techniques employ a Document Object Model (DOM)-recursive resource allocation policy to manage resource sharing for certain types of resources. With this policy, a resource is divided recursively among a principal embedding hierarchy of a web entity. For instance, the resources may be divided equally among the top-level principals. A top-level principal may be the web entity that is opened within a browser tab. In an example, if the top-level principal embeds three other principals, the resource share may be split into four by dividing among the top-level principal and each of the embedded principals. These four would equal a total share granted to another top-level tab. Thus, the DOM-recursive resource allocation policy provides fairness across the contending principal instances at a same level of the principal embedding hierarchy.

In another implementation, the resource management service manages resource sharing using an application-specified resource allocation policy for web entities. This technique is used when a web entity itself may know how to optimally allocate resources among itself and embedded content. This technique enables web programmers to explicitly influence resource management based on the web entity semantics. In particular, a prioritizing order may be identified for the resources based on the embedded content. The prioritizing order of the resource may be determined based on a level of a parent or a child. Furthermore, the application-specified resource allocation policy may also allow a predetermined network bandwidth to be expressed, which indicates the bandwidth needed for optimal service quality.

While aspects of described techniques can be implemented in any number of different computing systems, environments, and/or configurations, implementations are described in the context of the following illustrative computing environment.

Illustrative Environment and Architecture

FIG. 1 is a block diagram of an illustrative environment 100 in which resource management services may be accessed from a web browser or other client application on a computing device. The environment 100 includes an illustrative computing device 102, which may take a variety of forms, including, but not limited to, a desktop computer, a portable handheld computing device (e.g., a personal digital assistant, a smart phone, a cellular phone), a thin client, a laptop computer, a media player, or any other device capable of connecting to one or more network(s) 104 to access network services, a network service provider, a web site, web entity, and the like. A user 102 may employ the illustrative computing device 102 to connect to the one or more network(s) 104.

The one or more network(s) 104 represents any type of communications network(s), including multiple different types of networks, interconnected with each other and functioning as a single large network (e.g., the Internet or an intranet). The network 104 may include wire-based networks (e.g., cable), wireless networks (e.g., cellular, satellite, etc.), cellular telecommunications network(s), and IP-based telecommunications network(s) (e.g., Voice over Internet Protocol networks). The network 104 may use any number of protocols and configurations to enable the computing device 102 to access other devices, content, information, and resources.

The computing device 102 may include a "standard" or "conventional" operating system identified as OS 108. In some implementations, this OS 108 may be a commercially available product, such as the WINDOWS® family of operating systems. The OS 108 is the interface between hardware and the user 106, handles details of the operation of the hardware, manages services and application programs. Typically, the application programs may request service from the OS 108 by system calls.

The computing device 102 also includes a multi-principal browser 110. The multi-principal browser 110 manages resources and sharing of resources between various web site principals. The multi-principal browser 110 includes a browser kernel. More discussion follows in FIG. 2 on this architecture. The OS 108 recognizes the user 106 as a principal and the multi-principal browser 110 recognizes web entity as a principal. The web entity includes, but is not limited to, a web application, a web page, a web site, a web service, a process of a web service, and the like. The web entity may be accessible through a web browser over the Internet or an intranet. The web entity may have embedded content associated with it.

In the illustrated example, the browser kernel may include a resource sharing module 112 to implement resource management, specifically the resource sharing services. The resource sharing module 112 provides resource sharing services to manage the resources and to determine how the resources may be shared among the principals that are in contention. As mentioned previously, the resources may include a computer processing unit (CPU), a memory, a network bandwidth, display, and devices like a camera, a microphone, or a global positioning system (GPS) navigation unit. Furthermore, the resource sharing module 112 may incorporate functionality to provide resource management services to the computing device 102, including identifying the resources to be shared, assigning resource allocation, terminating allocation of the resources, giving absolute priority of resource use, and the like. Furthermore, the resource sharing module 112 may split resources equally among the top-level contending principal instances, assuming there is a principal embedding hierarchy of a web application. The web entity may include a web site or a web application as a first-class principal in the multi-principal browser 110 with the resource module 112.

The environment 100 includes one or more web site servers 114(1), 114(2), ..., 114(S) which may be a representative set of servers that is accessible via the network(s) 104. The servers 114 may be independent servers, or a collection of servers that are configured to perform larger scale functions (e.g., a server farm or a datacenter), or a set of servers configured to host one or more sites (e.g., web sites) accessible by the network 104. In the illustrated example, the servers 114 may represent private servers that serve content and programming (e.g., operating system, principal operating system-based browser) to the computing device 102, the thin client, and the like. Alternatively, the servers 114(1)-114(S) may represent a wireless services provider that provides content to wireless devices. In still other implementations, the servers 114(1)-114(S) may be configured to host a service provider, such as a web site accessible by the computing device 102 via the Internet.

These various arrangements exhibit examples of environments where a resource sharing module 112 may be employed, working in operation with the browser kernel and the principal operating system-based browser 110. In the illustrated example shown in FIG. 1, the user 106 operates the computing device 102 to connect via the network(s) 104 to the servers 114. In this example, the resource sharing module 112 in operation with the browser kernel, the principal operating system browser 110, are capable of applying a resource allocation policy or of receiving application-specified allocation from a web programmer or web applications. The resource sharing module 112 may determine how to share the resources in response to the policies, web programmer instructions, web applications, or may manage the resources on a pre-determined basis, such as custom allocations adjusted programmatically at runtime or absolute priority granted for web entities that are considered critical.

In an implementation, a resource sharing module may be located on a server or may be part of an operating system browser on the server accessible by a computing device. In some instances, the resource sharing module may be executed with a server-side resource sharing module to manage resources by monitoring ongoing resource sharing and activities between the computing device and the principal operating system browser servers.

Figure 2:
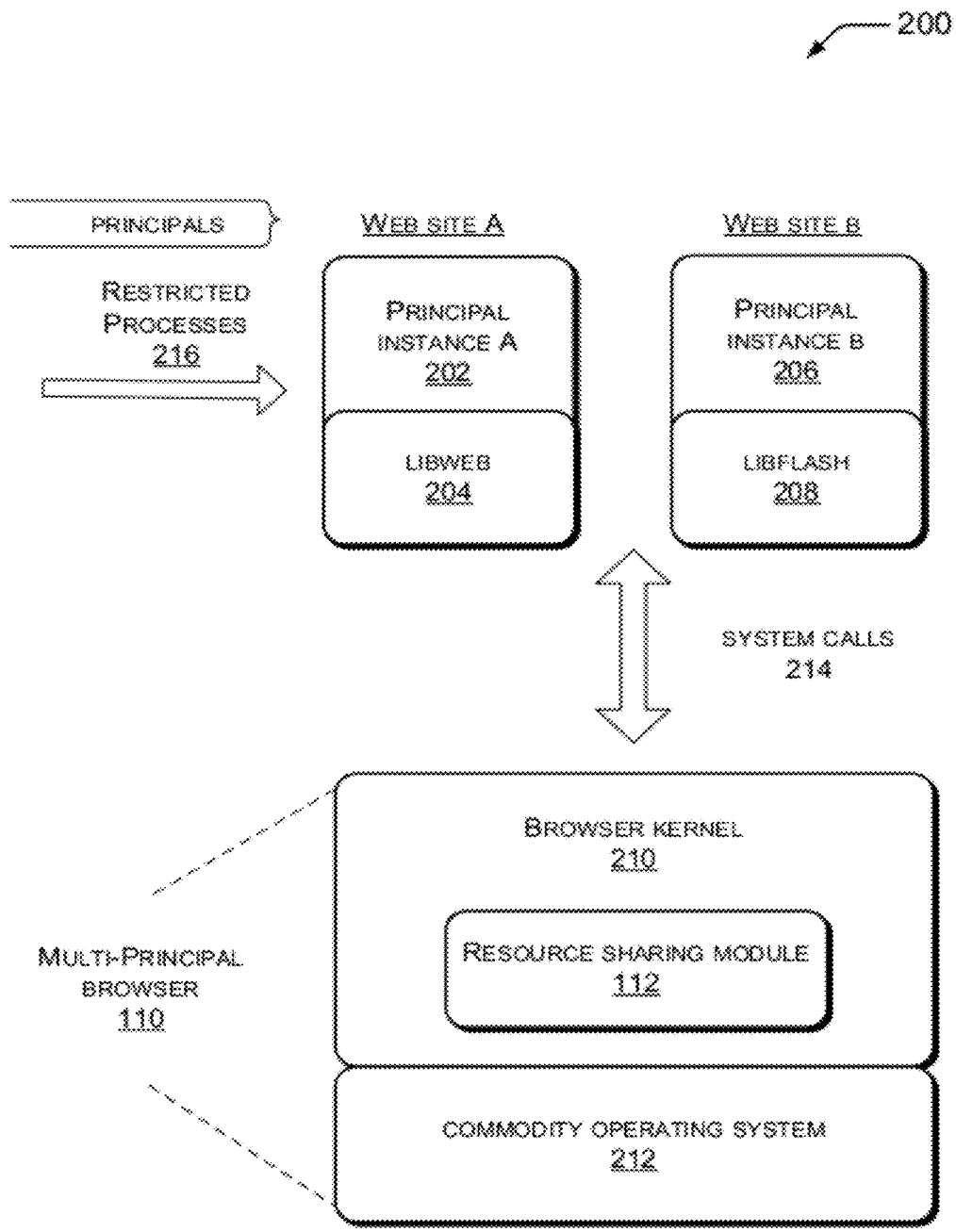
FIG. 2 is a block diagram showing an architecture for the multi-principal browser in the environment of FIG. 1.

FIG. 2 is a block diagram showing an illustrative architecture 200, for the principal operating system-based browser 110 that supports web applications or web sites as first-class principals. In particular, the multi-principal browser 110 in operation with the resource sharing module 112 are to manage resource sharing. As mentioned previously, a principal may be a web site. A principal instance may be illustrated as representing the web site.

The principal may be labeled with a triple notation of <protocol, domain name, port>, as in a same-origin policy that is found in today's browsers, which are not constructed as multi-principal operating systems. The principals (web sites) may have different origin tuples, and each principal's content is put into a separate principal instance for that origin tuple.

Shown are two web site principals, web site A and web site B. Web site A may include principal instance A 202 and LibWeb 204 while Web site B may include principal instance B 206 and LibFlash 208. These are runtime libraries for a particular kind of web content, (i.e., LibWeb is used for web content of HTML/JavaScript and LibFlash is used for Flash content) that utilize the browser kernel's system calls to access resources. The web site principals, web site A and web site B, may embed other principals through frame and object tags.

The principal may be a unit of protection. Principals may be completely isolated in resource access and usage. Any type of resource sharing may be made explicit in the process. Similar to desktop applications, where instances of an application are run in separate processes for failure containment and independent resource allocation, the principal instance may be a unit of failure containment and a unit of resource allocation. For example, navigating to the same URL in different tabs corresponds to two instances of the same principal; when a.com embeds two b.com iframes, the b.com iframes correspond to two instances of b.com. However, the frames that share the same origin as the host page may be in the same principal instance as the host page by default. Though the host page may be allowed to designate an embedded same-origin frame or object as a separate principal instance for independent resource allocation and failure containment. Principal instances may be isolated for all runtime resources, but principal instances of the same principal may share persistent state, such as cookies and other local storage. Protection unit, resource allocation unit, and failure containment unit may each have a different mechanism depending on the system implementation. Because the implementation of the principal instances may contain native code, the operating system processes may be used for all three purposes.

The multi-principal browser 110 may include a browser kernel (BK) 210, the operating system 108 now operating as a commodity operating system (OS) 212, and the resource sharing module 112. The BK 210 runs in a separate protection domain and interposes between the browser principals and the commodity OS 212 (i.e., the OS 108 may be customized). The BK 210 mediates the principals' access to system resources by functioning as an operating system to the browser principals. For example, the BK 210 handles principal operating system calls 214 from the principal instances A 202 and B 206 and utilizes the commodity OS 212 to manage the resources. The logic for processing the web entity (e.g., libweb, libflash, other plug-ins) may reside in the principal space, and the BK 210 may be agnostic to web entity semantics. The resource management functionality may be mostly handled in the BK 210 with guidance from the resource sharing module 112 and with some customization of the OS 108, now operating as the commodity OS 212. In an implementation, the process may customize a CPU scheduling in Windows® in order to manage resources.

The process may restrict the principal instance's process where the principal instance A 202 and B 206 issues a system call 214 by inter-process communication (IPC) to the browser kernel 210. The process operates without interacting with the underlying operating system 108, now referred to as the commodity operating system 212, and may issue system calls 214 to the browser kernel 210. The browser kernel 210 runs as a separate process in the commodity OS 212, and in combination with the resource sharing module 112 manages system resources for the web principals, web sites A and B. As indicated by the arrow on the left, each principal instance, principal instances A 202 and B 206, may execute in a restricted operating system process 216 for the browser runtime.

Implementation of the browser kernel 210 and separating the principals into principal instances A 202 and B 206 may enforce several beneficial results: First, communication and sharing across the protection boundaries of each principal may be explicit and may use the browser kernel 210. Second, least privileges (that is, giving no more privileges than necessary for operation) for each principal are maintained, so compromise of a principal will not give the principal more capabilities than already permitted by the browser kernel 210. Third, security policies may be enforced for plug-ins. Fourth, the browser kernel 210 provides a central point to implement security decisions, resulting in a simpler and more robust architecture. Thus, security policies may be consistent across all resources, including memory, Document Object Model (DOM) objects, script objects, persistent state objects such as cookies, display, and network communications.

Illustrative Computing Device

Figure 3:
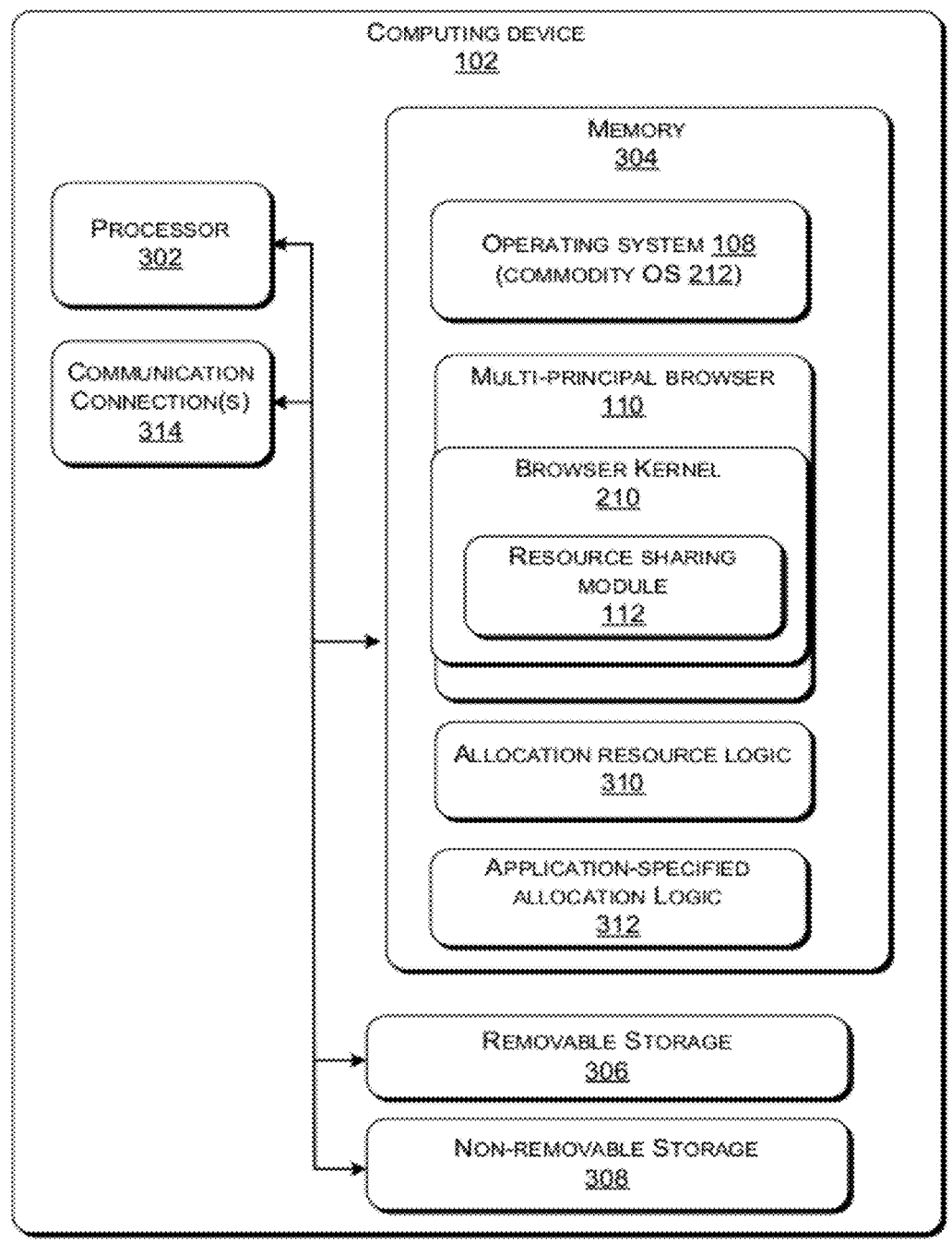
FIG. 3 is a block diagram showing an illustrative computing device usable with the environment of FIG. 1 and the architecture of FIG. 2.

FIG. 3 is a schematic block diagram showing details of an illustrative computing device or server, such as the computing device 102 of FIG. 1. The computing device or the server may be configured as any suitable system capable of managing resources, which includes, but is not limited to, identifying, tracking, detecting, allocating, assigning, sharing, and splitting the resources.

In one illustrative configuration, the computing device 102 includes at least one processor 302 and a memory 304. The computing device 102 may also include additional removable storage 306 and/or non-removable storage 308.

Turning to the contents of the memory 304 in more detail, the memory 304 may store the operating system 108/commodity OS 212, the multi-principal browser 110, the browser kernel 210, the resource sharing module 112, and one or more applications for implementing all or a part of the resource management services.

The memory may include an allocation resource logic 310, or this may be included as part of the multi-principal browser 110, or the functionality may be included as part of the resource sharing module 112. The allocation resource logic 310 may provide a policy to determine how much of a resource each contending principal instance receives based on the policy. In an implementation, a Document Object Model (DOM)-recursive resource allocation policy may be used by default.

The DOM-recursive policy is fair and prevents an embedded, misbehaving principal from monopolizing resources. The fairness includes assigning a balanced and a proportional share of the resources or a predetermined amount of resource allocation to the web entities. This DOM-recursive policy corresponds to a Hypertext Markup Language (HTML) DOM tree's hierarchical relationship between involved principals. The DOM-recursive policy may be used for divisible resources, such as CPU, network bandwidth, and for transactional resources. The resources like a photo camera, a GPS navigation unit, and an accelerometer are considered transactional. Transactional in the sense that each device interaction takes just one synchronous system call, for a short transaction (rather than a long session). With this policy, the resource may be divided recursively along the principal embedding hierarchy of a web entity. In an implementation, the resource sharing module 112 in operation with the multi-principal browser 110 may divide the resource into equal fractions among the top-level contending principal instances (each of which runs in a separate browser tab). The fraction of the resource assigned to the principal instance may then be split fairly among the principal instance itself and all of its embedded principal instances that are actively contending for the resource. One key property of the DOM-recursive policy is that it provides fairness, such as a balanced and a proportional share of the resources across all the contending principal instances at the same level of the principal embedding hierarchy, but not across all the principal instances.

The allocation resource logic 310 in operation with the resource sharing module 112 may identify different resource allocation mechanisms for different types of resources. In an implementation, the allocation resource logic 310 may identify the resource allocation as a scheduler used with the DOM-recursive policy for allocating computing processing unit and transactional resources. In another implementation, the allocation resource logic 310 may identify the resource allocation as bandwidth shapers for allocating network bandwidth. In yet another implementation, the allocation resource logic 310 may identify the resource allocation as the browser kernel 210 for allocating memory to principal instances. In one instance, the allocation resource logic 310 may identify a parent allocating display to its children. Also, the allocation resource logic 310 and resource sharing module 112 may identify the browser kernel 210 as the resource allocation for dynamic principal embedded principals. The principals are ones that are created and embedded by another principal dynamically during the rendering/execution in the browser. Thus, for resources scheduled with the DOM-recursive policy, the browser kernel 210 may recalculate the resource shares for the schedulers. The resource options described may allow the multi-principal browser 110 to insulate resource usage of a web page from untrusted content it embeds and to allocate resources fairly among multiple web entities or applications embedded on the same web page.

In some implementations, memory 304 may include an application-specified allocation logic 312, or this may be included as part of the multi-principal browser 110, or the functionality may be included as part of the resource sharing module 112. The application-specified allocation logic 312 may be used when a web entity itself may know how to optimally allocate resources among itself and embedded content associated with the web entity. In an example, a web entity such as a.com may embed an untrusted ad, the web entity itself might want to restrict the ad's CPU and memory usage. In another example, if a.com embeds a video application, the web entity might indicate that this video may best be viewed with a bandwidth of 200 Kbps. To support such scenarios, the application-specified allocation logic 312 may enable web programmers to provide application-specified resource allocation policy for their web entities. This logic does not violate hierarchical fairness.

The application-specified allocation logic 312 may be based on different attributes or policies that are determined by the web entity, a web programmer, or in combination with the service provider. In some implementations, the application-specified allocation logic 312 may identify priority levels for the web entity to determine the resource allocation.

For example, the web entity or the web programmer may assign a higher priority or give more weight for a particular attribute to determine whether to grant resource allocation. In some instances, the attribute assigned with the higher weight may be a parent level associated with the embedded content (e.g., such as parent web site embedded with child of untrusted ads). In another example, the web entity or the web programmer may assign a lower priority or less weight for an embedded application or web content to terminate the application (e.g., web site associated with embedded ads). The application-specified allocation logic 312 may monitor changes to the embedded content or web applications or to a change in the parent-child level, on a pre-determined time interval, such as every x milliseconds, or in response to receiving notification from the web content (i.e., web sites or web applications).

The allocation resource logic 310 and the application-specified allocation logic 312 in operation with the resource sharing module 112 may determine suitable resource allocation mechanisms for the web entity based at least in part on the type of resource or on the priority of the entity, respectively. The allocation resource logic 310 may manage resource options for the web entity, such as the web applications from the web sites. The resource sharing actions provide superior service quality, fairness, and security, as this enables the web entities to operate to capabilities similar to desktop applications.

The computing device 102 may also contain communications connection(s) 314 that allow the processor 302 to communicate with other computing devices, other network servers, network storage, and/or other devices on the network(s) 104.

The computing device 102 may also include one or more known input device(s), such as a keyboard, mouse, pen, voice input device, touch input device, etc., and output device(s), such as a display, speakers, printer, etc. All these devices are well known in the art and are not discussed at length here.

Any memory described herein may include volatile memory (such as RAM), nonvolatile memory, removable memory, and/or non-removable memory, implemented in any method or technology for storage of information, such as computer-readable storage instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which may be used to store the desired information and which may be accessed by the respective systems and devices.

The computing device 102 as described above may be implemented in various types of systems or networks. For example, the computing device may be a part of, including but is not limited to, a client-server system, a peer-to-peer computer network, a distributed network, an enterprise architecture, a local area network, a wide area network, a virtual private network, a storage area network, and the like.

Illustrative Resources and Approaches

Figure 4:
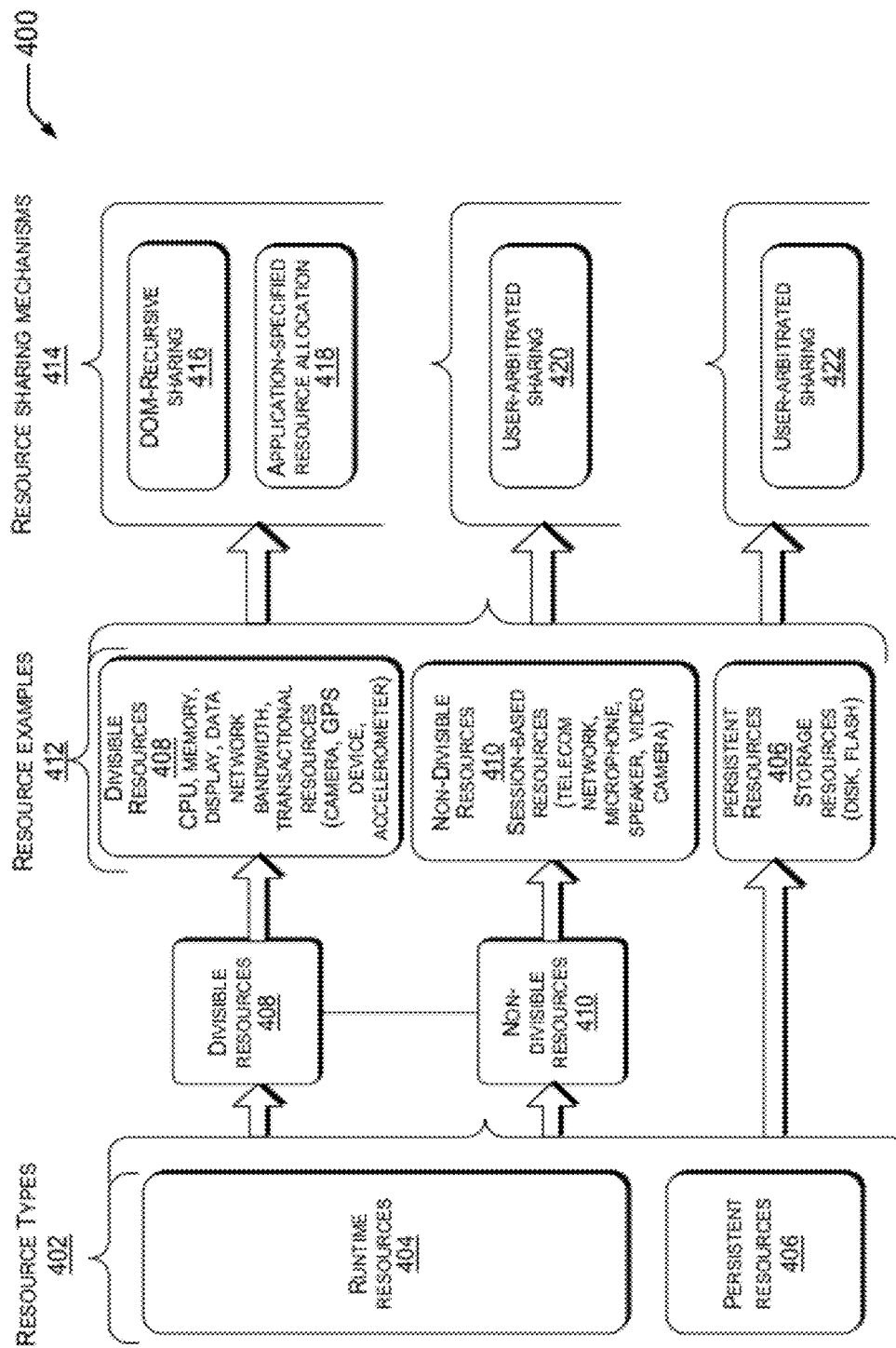
FIG. 4 is a block diagram showing illustrative resources by identifying resource types, illustrating resource examples, and showing resource sharing mechanisms.

FIG. 4 is a block diagram showing illustrative resource characterization 400 for identifying a resource type, providing resource examples, and determining the resource sharing mechanisms that may be performed based on at least in part of the resource type.

In the first column on the left, the resources types 402 may be divided into runtime resources 404 and persistent resources 406. The runtime resources 404 may only be available when the browser is on, while the persistent resources 406 like storage may survive browser restarts.

In the second column, the runtime resources 404 may be further subdivided into divisible resources 408 and non-divisible resources 410. A divisible resource 408 may allow fractions of the resource (whether in time dimension or space dimension) to be shared or allocated among the contending principal instances. Typically, non-divisible resources 410 may not be divided in time or space.

In the next column, shown are three kinds of resource examples 412: divisible resource examples 408, non-divisible resource examples 410, and persistent resource examples 406. The divisible resource examples 408 include but are not limited to, CPU, memory, display, data network bandwidth, and transactional resources. The multi-principal browser 110 treats the resources like a photo camera, a GPS navigation unit, and an accelerometer as transactional, in the sense that each device interaction takes just one synchronous system call; each use is a short transaction (rather than a long session). Transactional resources are also divisible resources 408 since their system call invocations (along the time dimension) may need to be fairly processed for contending principal instances.

The non-divisible examples 410 may include session-based resources, such as, a telecom network, a microphone, a speaker, and a video camera.

Note that, an allocated fraction of certain resources may be accessible to only one authorized principal instance or principal at a time. For example, a CPU time slice or a piece of memory allocated for the principal instance may only be used by that principal instance. On the other hand, resources like the speaker, the microphone, and the video camera may support simultaneous access from multiple principal instances. For example, several principal instances may be fine with outputting to the speaker concurrently and having their audio data mixed together; audio and video streams from the microphone, and the video camera may be received simultaneously by multiple principal instances for various recording purposes.

The persistent resource examples 406, include storage resources, such as disk and flash. In some instances, the persistent resource examples 406 may be the browser's storage resources, which include cookies and local storage.

Based on the resource types 402, the resource sharing mechanisms 414 may be determined from each type of resource. Described are possible resource sharing mechanisms 414, which include: DOM-recursive resource allocation policy 416, an application-specified resource allocation policy 418, and two based on user-arbitrated sharing approaches 420, 422. For divisible resources 408, the DOM-recursive resource allocation policy 416 and the application-specified resource allocation policy 418 may be applied when under resource contention.

For non-divisible resources 410, the user-arbitrated sharing 420 may be applied when under resource contention. As mentioned, the non-divisible examples 410 may include session-based resources, such as, the telecom network, the microphone, the speaker, and the video camera. When such resources are under contention, the user 106 may need to determine a winner based on their needs. For example, the user 106 may be on a phone using the telecom network through one application; if another application needs to make a phone call, the browser kernel may prompt the user 106 to make a decision to either staying on the current call or making a new call.

For persistent resources 406, the browser's storage resources may also include cookies and local storage. Only the user 106 may be responsible for reclaiming and arbitrating the storage space among principals when storage is under contention (e.g., running out of disk space) 422. In an example, the user 106 may prefer all of their address book to be present at all time, even if the address book for web applications has exceeded a fair share of the storage space.

For illustrative purposes, a table below shows summarizes exclusive-use and concurrent-use resources. For concurrent-use resources, web applications may be allowed to choose between concurrent and exclusive use. The multi-principal browser 110 provides defaults for all such devices, and web applications may be allowed to change the default later. For example, the multi-principal browser 110 permits concurrent use for the speaker by default, but not for the microphone for privacy reasons.

TABLE 1

Exclusive Use vs. Concurrent Use For Allocated Fraction of a Resource

| | |
|---|---|
| Exclusive use for principal instance | CPU, memory, display, network bandwidth, camera, GPS, dialer |
| Exclusive use for principal | Storage |
| Concurrent use | Speaker, microphone, video camera |

Illustrative Processes and Mechanisms

Figure 5:
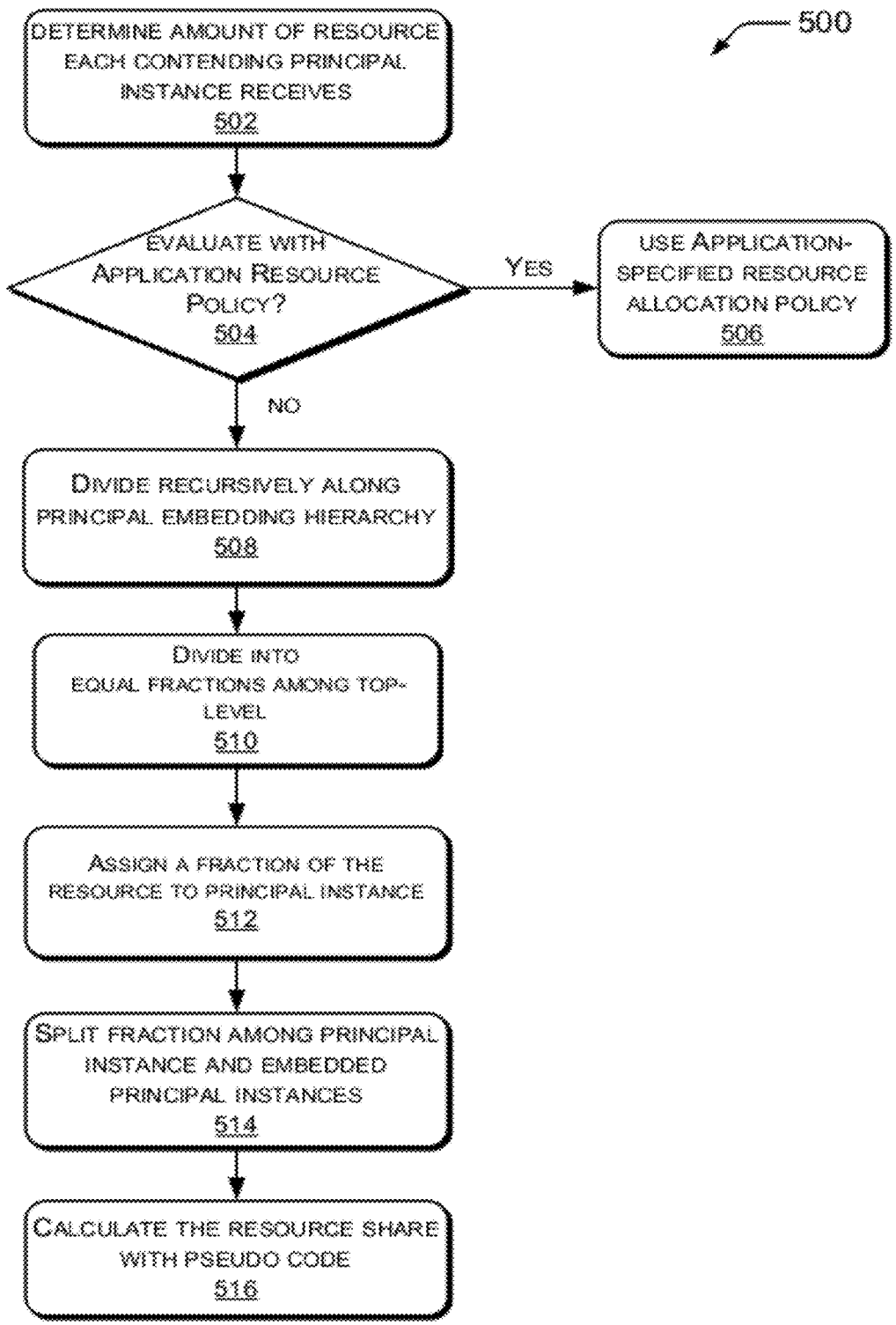
FIG. 5 is a flowchart showing an illustrative process of a Document Object Model (DOM)-recursive resource allocation policy.
Figure 8:
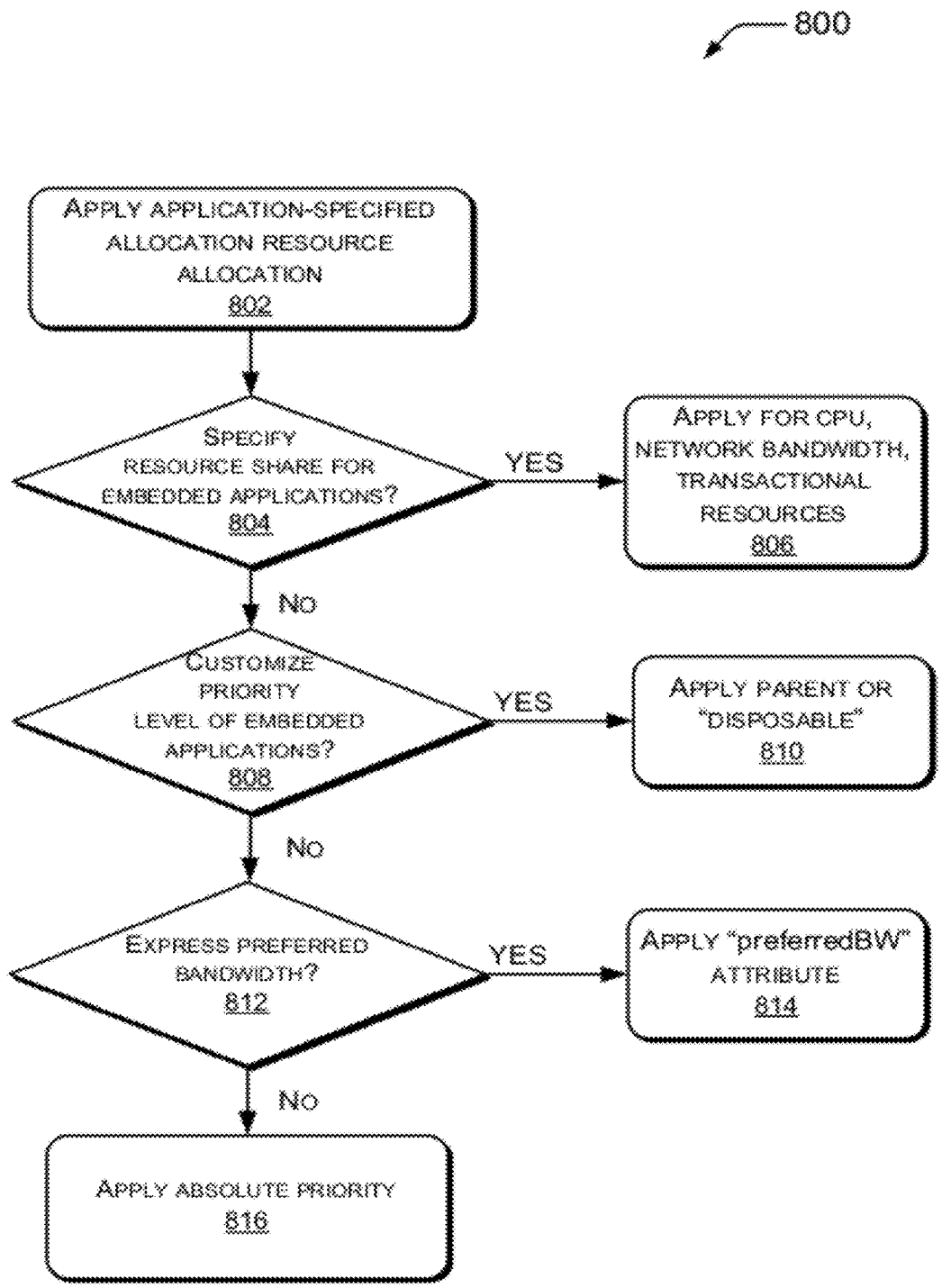
FIG. 8 is a flowchart showing an illustrative process of an application-specified resource allocation policy.

FIGS. 5 and 8 are flowcharts showing illustrative processes for determining resource sharing and determining how to allocate the resources. FIG. 5 is a flowchart based on at least in part on the DOM-recursive resource allocation policy and FIG. 8 is a flowchart based on at least in part on the application-specified resource allocation policy. The processes for the policies are illustrated as a collection of blocks in logical flowcharts, which represent a sequence of operations that may be implemented in hardware, software, or a combination. For discussion purposes, the processes are described with reference to the computing environment 100 shown in FIG. 1, the architecture shown in FIG. 2, the computing device 102 shown in FIG. 3, and the resources shown in FIG. 4. However, the processes may be performed using different environments and devices. Moreover, the environments and devices described herein may be used to perform different processes.

For ease of understanding, the methods are delineated as separate steps represented as independent blocks in the figures. However, these separately delineated steps may not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

DOM-Recursive Resource Policy and Mechanisms

Figure 6:
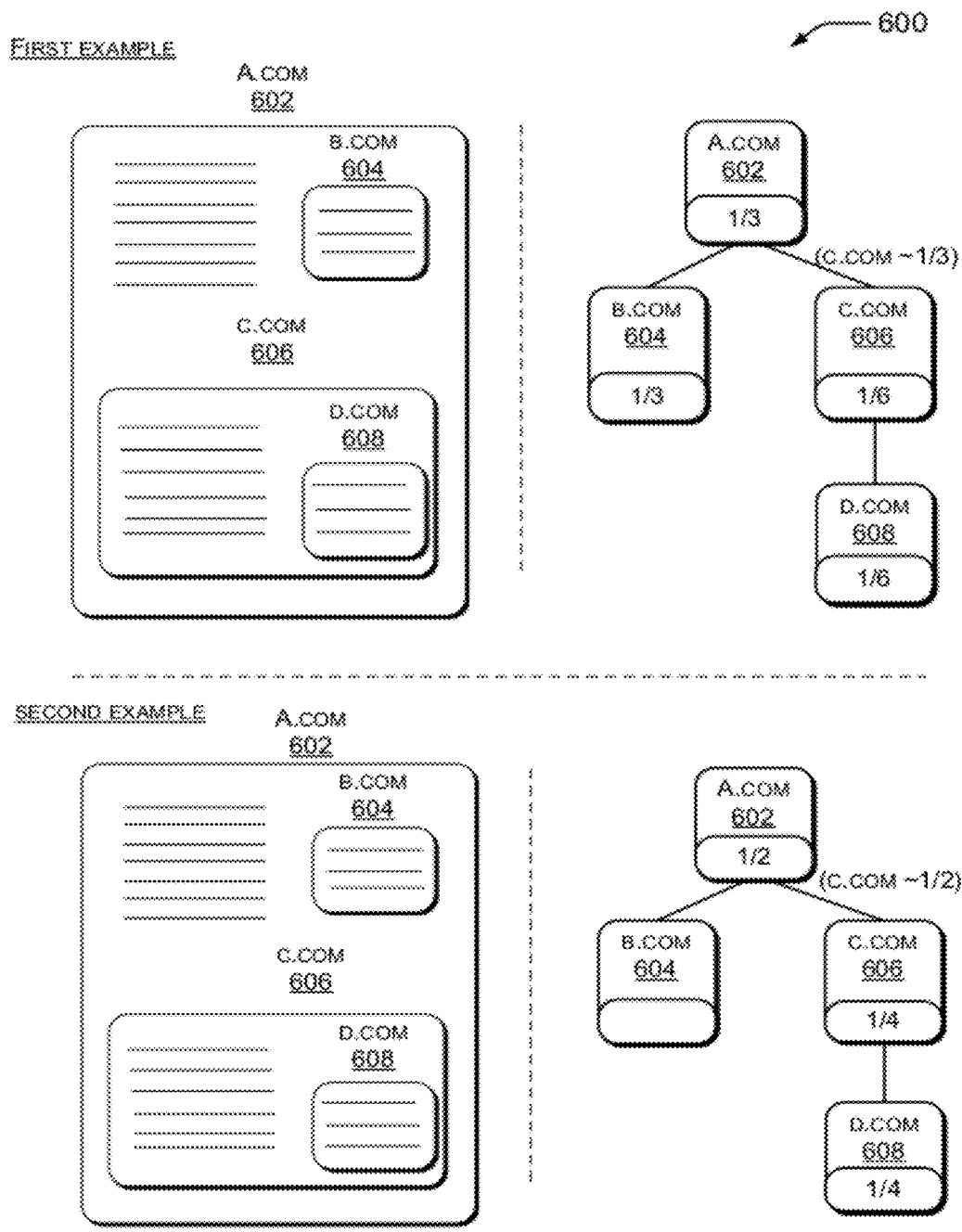
FIG. 6 is a block diagram showing an illustrative DOM-recursive resource allocation policy usable with the flowchart of FIG. 5.
Figure 7:
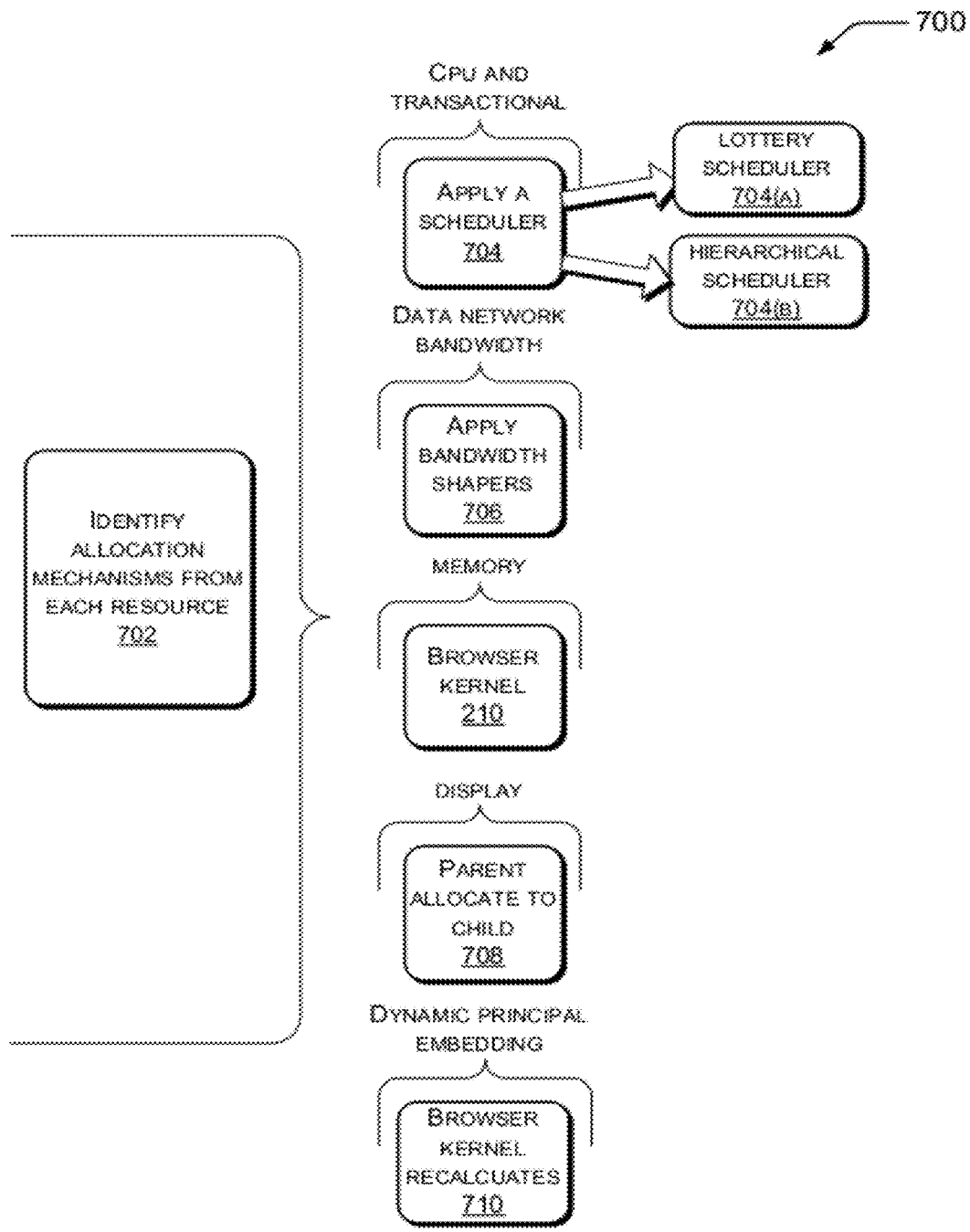
FIG. 7 is a block diagram showing illustrative resource allocation mechanisms.

FIGS. 5-7 illustrate resource allocation and resource allocation mechanisms. FIG. 5 is an illustrative process of the DOM-recursive resource allocation policy, FIG. 6 are examples of allocating the resource using instructions from the DOM-recursive resource allocation policy, and FIG. 7 illustrates examples of resource allocation mechanisms.

FIG. 5 is a flowchart illustrating the illustrative process 500, describing in details the instructions for the DOM-recursive resource allocation policy. The resource sharing in the multi-principal browser 110 is performed on principal instances, which form the unit of resource allocation. In the discussion that follows for resource sharing, the resources identified may include the divisible resources 408 and the transactional resources.

In the face of resource contention, fairness across contending principal instances (e.g., round-robin CPU scheduling for desktop applications in a commodity OS) may not be possible for the web entities. Unlike desktop applications, the web entity may embed content from other principals; enabling the web entity to acquire an arbitrary amount of resources.

Referring to FIG. 5 illustrates the process for resource sharing, which includes determining the amount of resource that each contending principal instance receives 502. Thus, resource sharing is possible in the multi-principal browser 110 where the resource sharing module 112 may help determine the amount of resource for the principal instances, which form the unit of resource allocation. As mentioned previously, some of the principal instances are contending for resources.

The process identifies whether the application-specified resource allocation policy is used 504. If the application-specified allocation policy is used, the process proceeds to the right side to block 506. Application-specified resource allocation policy is used when the web entity itself may know how to optimally allocate resources among itself and embedded content. More discussion on the application-specified resource allocation policy follows in FIGS. 8 and 9.

Returning to block 504, in the absence of application-specified resource allocation policy, the process proceeds down to evaluating resource allocation with the DOM-recursive resource allocation policy. This policy may be used by default for CPU, network bandwidth, and transactional resources to decide how much of a resource each contending principal instance receives. The process evaluates the policies at each level, so that application-specified semantics may not violate hierarchical fairness. For example, after dividing a resource equally among top-level principals (tabs), the process initially determines whether to apply application-specified resource allocation policies to the top-level principal. If the application-specified resource allocation policy is available, it may be used. However, if it is not available, the DOM-recursive resource allocation policy may be used by default. For each embedded principal on the second level, third level, and other levels, the process may be repeated. While application-specified resource allocation policy may be used for efficiency, it may not be specified, so DOM-recursive policy is used.

With DOM-recursive policy, the resource may be divided recursively along the principal embedding hierarchy of a web entity 508. Namely, the multi-principal browser 110 in operation with the resource sharing module 112 may divide the resource into equal fractions among the top-level contending principal instances 510 (each of which runs in a separate browser tab).

Next, the process may assign a fraction of the resource to a principal instance 512. The assigned fraction may then be split fairly among the principal instance itself and all of its embedded principal instances that are actively contending for the resource 514. Two examples are described for FIG. 6 on how the fraction may be assigned.

Then, the process may advance to providing a pseudo code for the DOM-recursive policy. The process calculates the resource share for each contending principal instance using the pseudo code 516. The pseudo code is shown below:

```
allocate(null, top_level_principal_instances,1);
function allocate(parent, children, amount) {
    numChildren = |children|;
    if (parent != null) {
        numChildren++;
        share[parent] = amount/numChildren;
    }
    foreach principalInstance in (children) {
        share[principalInstance] = amount/numChildren;
        if (hasChildren(principalInstance))
            allocate (principalInstance,
                    principalInstance.children,
                    share[principalInstance]);
    }
}
```

Turning to FIG. 6 is a block diagram of an illustrative allocation 600 of assigning the fraction. Shown in a first example on the top portion are four web sites, a.com 602, embedded content b.com 604, embedded content c.com 606, and embedded content d.com 608. One web site, a.com 602 is the only top-level web page (i.e., only one tab is opened). In this example, initially, there may be three principal instances such as a.com 602, b.com 604, and c.com 606, which may be actively contending for the resource. If there are three active principal instances contending, each principal instance, a.com 602, b.com 604, and c.com 606 may each receive equal shares, ⅓ of a resource. However, if d.com further competes for the resource, c.com 606 may splits its ⅓ share with the embedded content, d.com 608. Thus, c.com 606 may split its ⅓ among itself and d.com 608, so that each may get ⅙ of the resource.

Shown in a second example in the lower half of the diagram, assumes b.com 604 is not contending for the resource, that there are initially two principal instances contending for the resource, a.com 602 and c.com 606. The process may divide recursively along the principal embedding hierarchy and divide into equal fractions among the top-level. Based on the DOM-recursive policy, a.com 602 and c.com 606 each may receive ½ of the resource. Assume that d.com 608 further competes for the resource. Then c.com 606 may split its share of ½ resource among itself and the embedded contentd.com 608. The ½ is split among c.com 606 having ¼ and with d.com 608 having ¼ resource.

FIG. 7 illustrates resource allocation mechanisms 700, which are separate from resource allocation policy. The same DOM-recursive resource allocation policy applies for all the relevant resources, but resource allocation mechanism is different from each resource.

In block 702, the resource allocation mechanisms identified from each resource is shown. In block 704, for both CPU and transactional resources' allocation mechanism, existing proportional scheduling mechanisms, such as a lottery scheduling 704(A) or a hierarchical scheduling 704(B) may be used and fed with the DOM-recursive policy.

In block 706, various bandwidth shapers may be used to fair-share bandwidth across contending principal instances for the data network bandwidth allocation mechanism. Bandwidth contention may happen when the last-hop bandwidth is limited. For example, 3G networks offer an average of only 841 Kbps.

Web content is very complex and requires significant memory resources for processing. In an application-specified resource allocation policy, a web site may designate embedded content as "unimportant". If this occurs, the browser kernel 210 may terminate the embedded content under memory contention.

For example, a script on a web page (or in an embedded gadget) could exhaust the host's available memory, causing thrashing or denying memory allocation to scripts in concurrently executing web content. In block 210, the browser kernel 210 may manage memory to prevent such scenarios. It may be plausible for the browser kernel 210 to terminate an embedded untrusted ad that is stealing memory from a parent page and other top-level pages. However, this becomes difficult. Memory may be difficult to reclaim once allocated, yet denying a memory allocation ultimately denies execution. Thus, to improve memory management, the browser kernel 210 should have more information about a web page's resource usage semantics.

Block 708 illustrates display is typically allocated by a parent principal instance to its children through explicit position and dimension specifications, such as width and height attributes of frames and object tags. A balanced and a proportional sharing (i.e., fair sharing) of the display do not really impact web applications and is not discussed at length here.

Block 710 illustrates dynamic principal embedding to share resources. The principals change or customize content dynamically and/or frequently based on certain criteria. The embedded principals (e.g., through JavaScript's document-.createElement) may be easily incorporated into the resource sharing schemes. Such dynamically spawned principal instances result in new processes created by the browser kernel 210. For resources that are scheduled with DOM-recursive policies, the BK 210 recalculates the resource shares for the schedulers. Adding new principal instances does not change memory allocations of existing ones.

Application-Specified Resource Allocation Policy

Figure 9:
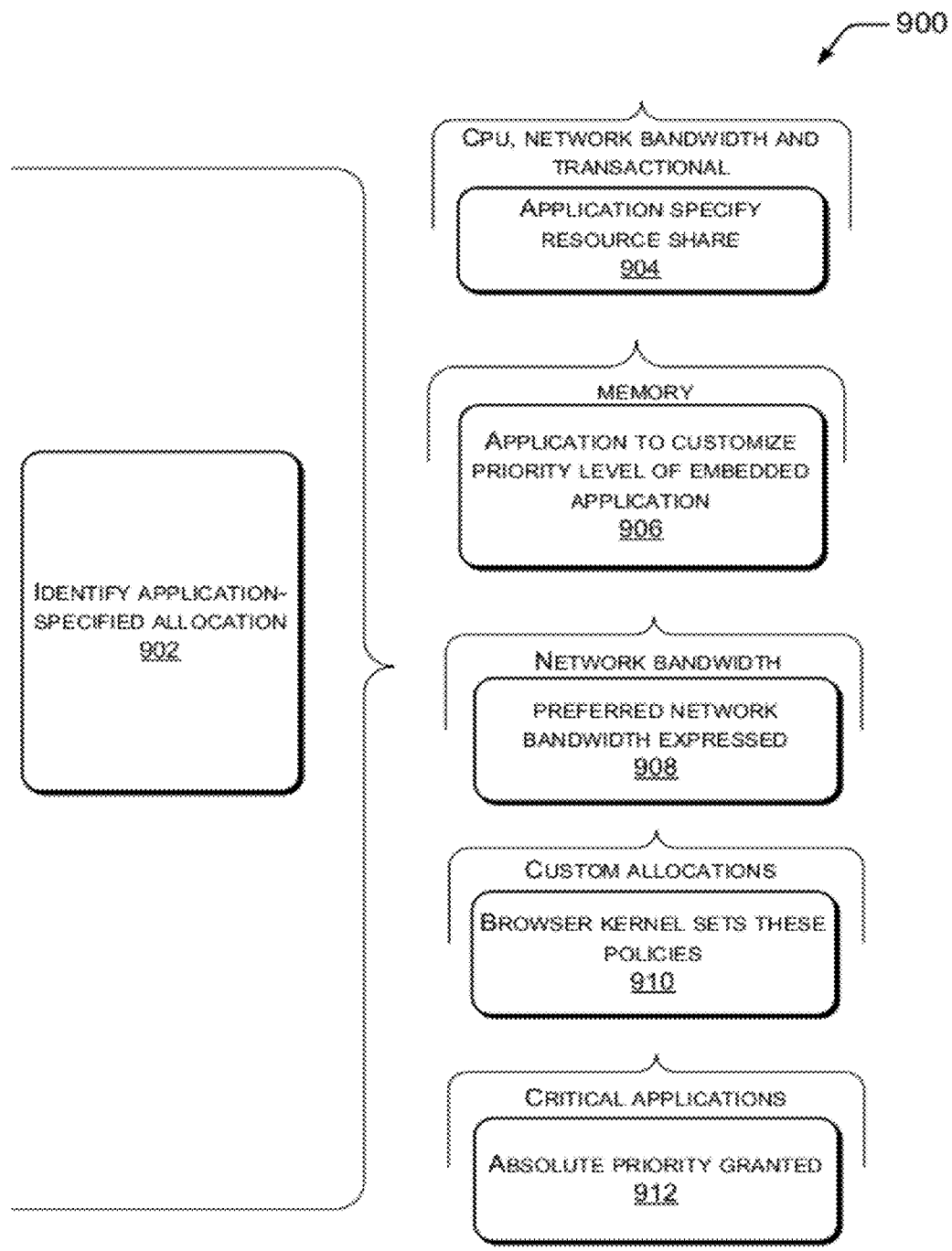
FIG. 9 is a block diagram showing illustrative mechanisms for the application-specified allocation policy.

FIG. 8 is an illustrative process of the application-specified resource allocation policy and FIG. 9 illustrates examples of resource allocation mechanisms.

FIG. 8 is a flowchart illustrating an illustrative process 800, describing in details application-specified resource allocation policy. The web application itself may know how to optimally allocate resources among itself and embedded content. For example, if a.com embeds an untrusted ad, it might want to restrict the ad's CPU and memory usage; if a.com embeds a video application, it might indicate that this video may be best viewed with a bandwidth of 200 Kbps. To support such scenarios, web programmers are enabled to provide application-specified resource allocation policy for their web applications. Note that this does not violate hierarchical fairness: as shown in FIG. 6, c.com's 606 resource policies may influence c.com 606 and d.com 608, but the policies may not affect resources granted to a.com 602 or b.com 604.

As mentioned, previously, there may be two policies to evaluate resource allocation for the principal instances. One implementation is the DOM-recursive resource allocation policy, discussed in detail in FIGS. 5-7.

The other implementation is to apply the application-specified resource allocation policy 802. This is used when the web application itself may know how to optimally allocate resources among itself and embedded content.

In block 804, the process may decide whether to specify a resource share for each of its embedded content. If the application specifies the resource share, the process proceeds to the right to block 806. The application specifies the resource share for the web entity (i.e., parent and child) for CPU, network bandwidth, and transactional resources 806. This allows the application to grant relative priorities among its children and itself.

Returning to block 804, the process may proceed to decide whether to customize priority level of the embedded content or embedded application 808. If the application customizes the priority level of the embedded content or embedded application, the process proceeds to the right to block 810. The process may customize the priority level by giving a weight or assigning a level to the web entity. For example, for memory, the application may customize a priority level of the embedded application to "disposable" or "parent". The former, "disposable" indicates that the embedded application may not be critical for parent's functionality and may be terminated when in memory contention; the latter, "parent" promotes its importance and memory usage priority to that of its parent.

Returning to block 808, the process may proceed to express a predetermined network bandwidth 812. If the web entity is expressed with the predetermined network bandwidth, the process proceeds to the right to block 814. Here, the predetermined network bandwidth may be expressed with a "preferredBW" attribute, which indicates the network bandwidth needed for optimal service quality 814. The embedded content with this specification will receive higher priority in receiving its predetermined bandwidth amount or the available bandwidth, whichever is smaller. When multiple embedded applications are given preferred bandwidth specifications and when the system may not satisfy all their needs, the bandwidth allocation will follow their relative proportions.

Returning to block 812, the process proceeds to absolute priority that is granted 816. This is one last consideration for the web entity that is considered critical by the user 106. Such as entities like these are granted absolute priority in resource use. For example, the web entity considered critical by the user 106 may be one that uses a telecom network or a top-level user interface.

FIG. 9 illustrates illustrative application-specified allocation mechanisms 900. In block 902, the application-specified resource allocation is specified by web entity, web programmers, and the like. In block 904, for CPU, network bandwidth, and transactional resources, the web entity may specify a resource share for each of its embedded content. This allows the web entity to grant relative priorities among its children and itself.

In block 906, for memory, the web entity may customize a priority level of an embedded content to "disposable" or "parent". This helps identify whether an embedded content may be terminated when in memory contention. Alternatively, the process may promote memory usage priority to that of the parent.

In block 908, the predetermined network bandwidth may be expressed with a "preferredBW" attribute, which indicates the bandwidth needed for optimal service quality. The embedded content with this specification will receive a higher priority in receiving the network bandwidth amount or the available bandwidth, whichever is smaller.

In block 910, custom allocations may also be adjusted programmatically at the runtime. These custom allocations result in system calls to the browser kernel 210; the BK 210 then sets these policies for resource allocation mechanisms.

In block 912, a last consideration is the web entity that is considered critical by the user 106. For example, the web entity like a telecom network may be considered critical by the user 106. The web entities that are considered critical are granted absolute priority in resource use.

As discussed above, certain acts in processes 500 and 800 need not be performed in the order described, may be modified and/or may be omitted entirely, depending on the circumstances. The DOM-recursive resource allocation policy, the resource allocation mechanisms, and the application-specified resource allocation policy described manage resource sharing in the principal browser-based operating system.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method implemented at least partially by a processor, the method comprising:
    sharing a resource between two or more different web entities that are contending for the resource, wherein a web entity includes a principal instance, the sharing being based at least in part on one or more of instructions from a resource allocation policy including:
        determining how much of the resource a contending principal instance receives;
        dividing the resource recursively along a principal embedding hierarchy of the web entity;
        assigning a fraction of the resource to the contending principal instance;
        subdividing the fraction of the resource share between the contending principal instance and an embedded content associated with the contending principal instance; and
    identifying resource allocations mechanisms to divide the resource based at least in part on:
        applying a scheduler to adjust CPU shares for principal instances;
        determining a fair-share bandwidth across the principal instances that are in contention;
        allocating memory to the principal instances through a browser kernel; and
        recalculating the resource share for a dynamic principal embedded content.

2. The method of claim 1, wherein the resource allocation policy comprises a Document Object Model (DOM)-recursive resource allocation policy.

3. The method of claim 1, wherein the assigning the fraction of the resource comprises dividing the resource into equal fractions among contending principal instances.

4. The method of claim 1, wherein the subdividing the fraction of the resource comprises splitting the fraction equally between the contending principal instance and the embedded content associated with the contending principal instance.

5. The method of claim 1, wherein the web entity comprises a web site or a web application as a first-class principal in a multi-principal browser using a module to allocate resource share.

6. The method of claim 1, further comprising permitting the principal instance in a multi-principal browser to issue a system call by inter-process communication (IPC) to a browser kernel.

7. The method of claim 1, wherein the allocating memory to the principal instances further comprises the browser kernel terminating a principal instance that has a lowest-priority to reclaim memory.

8. A system for resource sharing comprising:
    a memory;
    a processor coupled to the memory, the memory storing computer instructions that when executed, instruct the processor to perform acts comprising:
        identifying a resource to share between two or more different web entities that are contending for the resource in a multi-principal browser, wherein the resource is described based on resource type;

determining how to divide the resource to share between the different web entities based at least in part on a Document Object Model (DOM)-recursive sharing policy or an application-specified resource allocation policy, a web entity including a principal instance; and dividing the resource based at least in part on instructions from the Document Object Model (DOM)-recursive sharing policy or the application-specified resource allocation policy, along with the resource type.

9. The system of claim 8, further comprising a browser kernel to handle system calls from principal instances by interacting with a module on how to share the resource and with a customized commodity operating system to access the resource.

10. The system of claim 8, wherein the resource is divided using the DOM-recursive sharing policy, and wherein the dividing of the resource using the DOM-recursive sharing policy comprises instructions for dividing a resource recursively along a principal embedding hierarchy of the web entity by dividing the resource into equal fractions among principal instances that are contending for the resource.

11. The system of claim 8, further comprising insulating computer processing unit (CPU) usage of a web entity from untrusted content that is embedded in the web entity.

12. The system of claim 8, wherein the DOM-recursive resource allocation policy includes instructions comprising allocating a balanced and a proportional share of the resource among multiple web content embedded on a same web entity.

13. The system of claim 8, wherein the resource is divided using the application-specified resource allocation policy, and wherein the resource is divided based on instructions from the application-specified resource allocation policy comprising at least one of: granting priorities among the web entity and its children, customizing a priority level of an embedded content to determine whether to terminate the embedded content, or expressing a predetermined network bandwidth for service quality.

14. The system of claim 8, wherein the resource is divided using the application-specified resource allocation policy, and wherein a web entity designates embedded content as "unimportant", the browser kernel terminates the embedded content under memory contention.

15. A method implemented at least partially by a processor, the method comprising:
sharing a resource between two or more different web entities that are contending for the resource, wherein a web entity includes a principal instance, the sharing being based at least in part on one or more of instructions from an application-specified resource allocation policy, the instructions from the application-specified resource allocation policy includes:
determining how much resource to share between the different web entities;
specifying a resource share for a web entity and embedded content associated with the web entity;
prioritizing between two or more embedded content to receive the resource share,
identifying how much resource to share based on a predetermined network bandwidth for the web entity or the embedded content;
providing a custom allocation on how much resource to share for the web entity; and dividing the resource based at least in part on the instructions from the application-specified resource allocation policy, the instructions include:
specifying the resource share by assigning priorities among a parent and a child;
assigning the predetermined network bandwidth based on a priority for the web entity or the embedded content; and
granting an absolute priority in resource share for the web entity that is considered critical by a user.

16. The method of claim 15, wherein the specifying the resource share comprises:
assigning priorities to the parent and its children; and
promoting memory usage for the parent before the children.

17. The method of claim 15, wherein the specifying the resource share comprises terminating the resource share for memory for the child when in memory contention with the parent.

18. The method of claim 15, wherein assigning the predetermined network bandwidth comprises the embedded content has a higher priority in receiving the predetermined network bandwidth than the web entity.

19. The method of claim 15, wherein the providing the custom allocation comprises being adjusted programmatically at runtime by sending system calls to a browser kernel working with a module to manage the resource share.

20. The method of claim 15, wherein the granting the absolute priority for the web entity comprises a telecom network or a top-level user interface.

* * * * *